J. CRAIG.
CLUTCH.
APPLICATION FILED OCT. 17, 1910.
991,832.
Patented May 9, 1911.
2 SHEETS—SHEET 1.
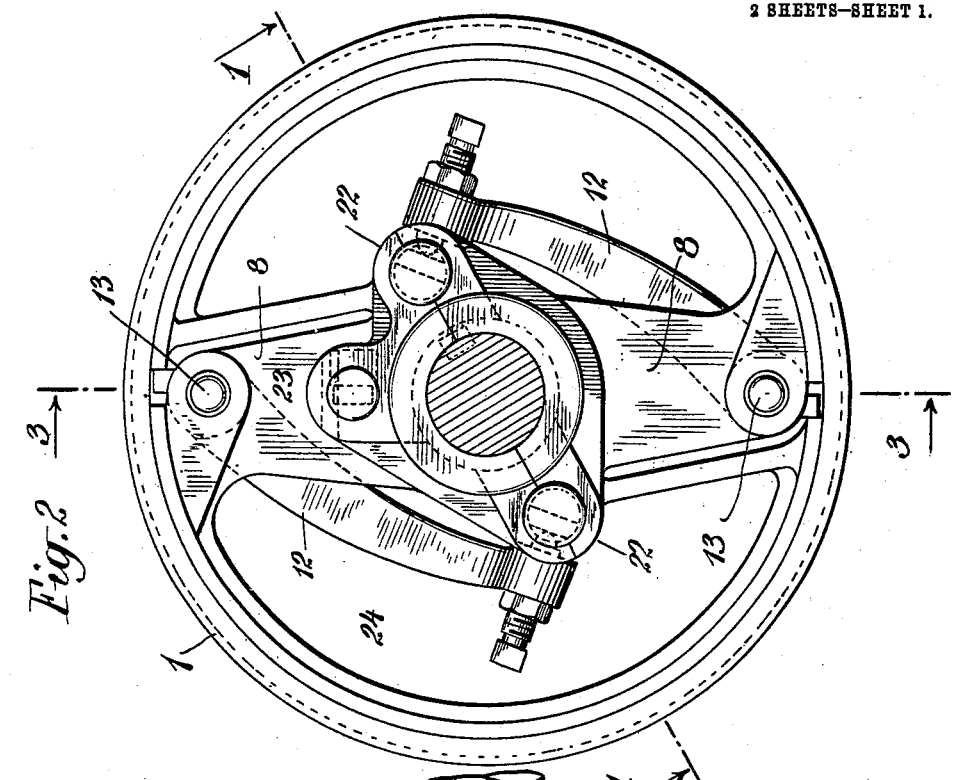
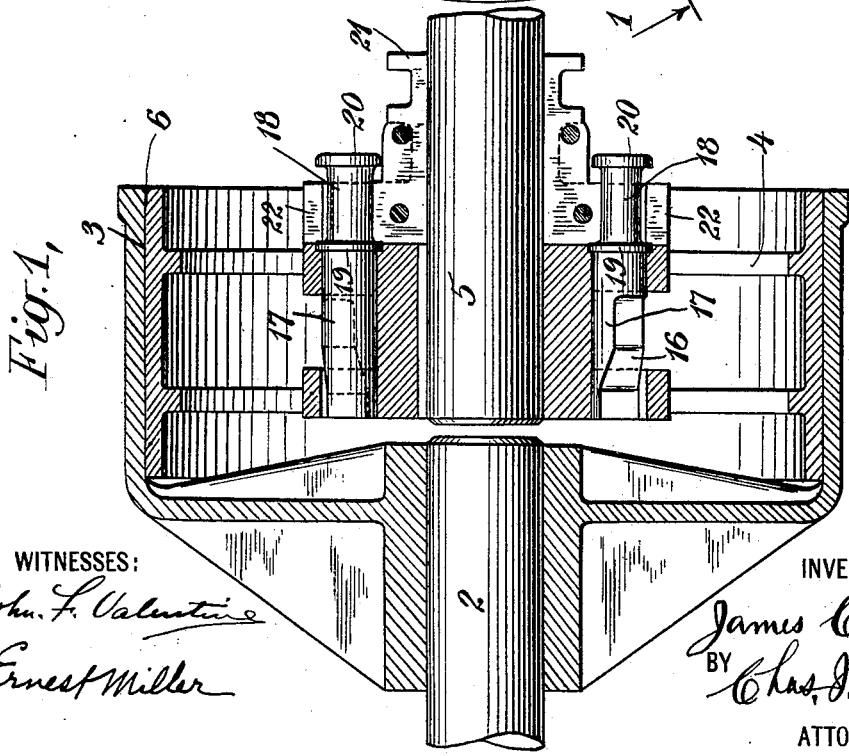
WITNESSES:
INVENTOR
James Craig.
BY
ATTORNEY.

J. CRAIG.
CLUTCH.
APPLICATION FILED OCT. 17, 1910.
991,832.
Patented May 9, 1911.
2 SHEETS—SHEET 2.
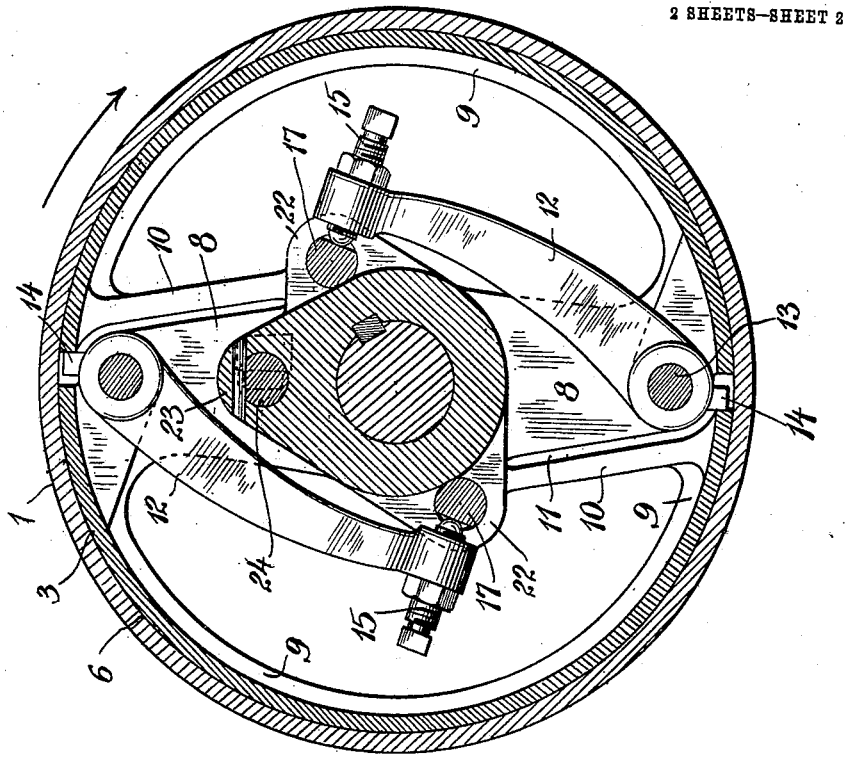
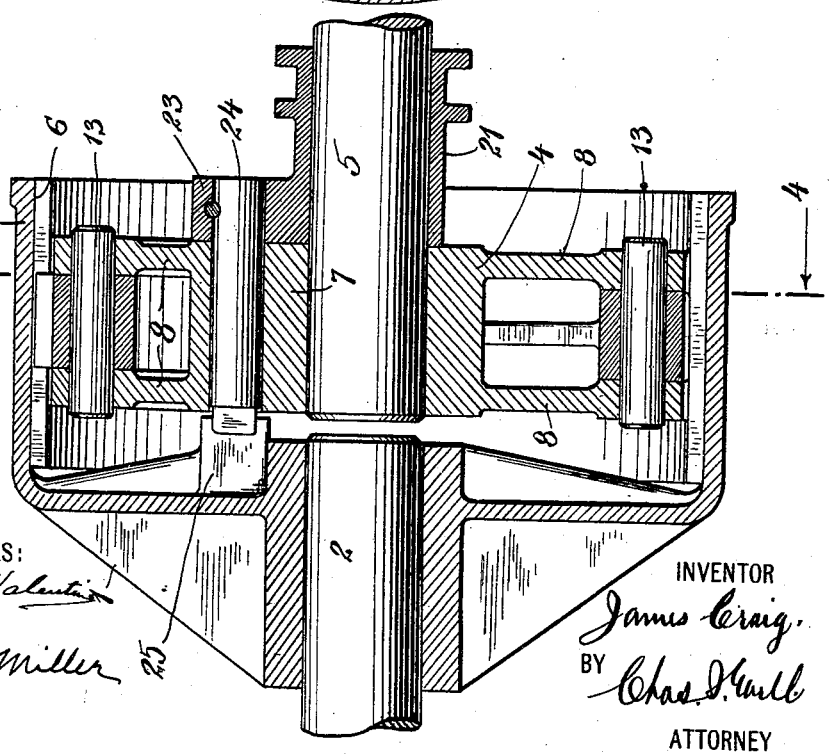
WITNESSES:
INVENTOR
James Craig,
BY
ATTORNEY

UNITED STATES PATENT OFFICE.

JAMES CRAIG, OF NEW YORK, N. Y.

CLUTCH.

991,832.      Specification of Letters Patent.      Patented May 9, 1911.

Application filed October 17, 1910. Serial No. 587,555.

*To all whom it may concern:*

Be it known that I, JAMES CRAIG, a citizen of the United States of America, and resident of the city, county, and State of New York, have invented certain new and useful Improvements in Clutches, of which the following is a specification.

My invention relates to clutches.

The object of my invention is to provide a clutch for transmitting power, particularly the power of an explosive engine, for driving the propellers of boats and in similar cases, where the circumstances are such that a friction clutch is desirable but within the limits of the space permissible it is inexpedient to rely upon friction alone. My clutch is a combination of a friction and a positive clutch.

The object is further to provide a clutch of this character which shall be simple and effective in its construction and operation and one which by means of the novel arrangement of the operating mechanism operates with greater facility than clutches of this character heretofore in use.

My invention consists in providing a friction clutch with a positive driving means which is thrown into action by the operating devices, always after the friction elements are thrown into full engagement, and which when the clutch is to be released or thrown out of action is thrown out of engagement prior to the operation of the releasing mechanism for the friction elements.

My invention consists in other novel features and constructions to be hereinafter more fully pointed out and described.

In the drawings accompanying and forming a part of this specification, Figure 1 is a section on line 1—1 of Fig. 2; Fig. 2 is an end view; Fig. 3 is a section on line 3—3 of Fig. 2; and Fig. 4 is a section on line 4—4 of Fig. 3.

Numeral 1 represents the driven member secured to the shaft 2. It is provided with an internal cylindrical friction surface 3.

Numeral 4 represents the inner clutch member mounted on the shaft 5 and having an external cylindrical friction surface 6 adapted to engage the surface 3. The inner member has a hub 7 which is keyed to the shaft and the hub is connected by the arms 8 to the rim 9 and the connecting rib or arm 10 also connects the rim 9 with the hub. The opening 11 between the rim and the rib 10 being formed so as to permit the two parts of the rim to expand into frictional engagement with the outer member. The levers 12 are mounted on pins 13, the said pins being mounted in the arms 8. The levers 12 are provided with projections or extensions 14 which engage the end of the rims 9 and expand the inner member. The levers 12 are provided with adjusting screws 15 whose ends engage the cam surfaces 16 on the pins 17. The pins 17 are slidably mounted in holes in the hub of the inner member and they have cylindrical portions 18 of reduced diameter between the collars 19 and 20. A slidable sleeve 21 is mounted on the shaft 5 and is provided with lugs 22 having openings formed therein to receive the cylindrical portions 18 of the pins 17. The lugs 22 are somewhat narrower than the space between the collars 19 and 20 of the pins 17 so that there is lost motion between the sleeve and the pins. The inner member is also provided with lug 23 having an opening therein to receive the pin 24; the pin 24 being rigidly secured to the lug 23 so that the pin 24 partakes of the full longitudinal movement of the sleeve 21. The end of the pin 24, when the sleeve is in its inner or engaging position, is adapted to engage the lug 25 on the outer clutch member 1. The high point of the cam 16 is so arranged as to throw the levers 12 to their extreme engaging positions just prior to the engagement of the pin 24 with the lug 25. When the clutch is thrown out of engagement the sleeve 21 will be moved to the right, as seen in Figs. 1 and 3. The initial movement of the sleeve to disengage, will, as will be readily understood, bring the pin 24 out of engagement with the lug 25, before the pins 17 on which the cams 16 are formed begin their movement.

In clutches of this character, especially when used in connection with boats driven by explosive engines, it is necessary to have the driving member in operation, generally at approximately full speed, before the clutch is thrown into action and power is applied to the propeller, as is well understood. A positive clutch would be soon destroyed under these circumstances. At the same time an ordinary friction clutch would be unsafe because of the likelihood of such clutches to get out of adjustment and for the further reason that in practice where installations of this character are employed the space required for a friction clutch adequate under all circumstances to give the required power, is not available.

It will be seen that by means of my construction the advantages of the friction clutch are obtained for connecting and disconnecting the driving and driven members and when the operating sleeve is carried to its full movement, if there should be any slipping between the friction surfaces, such as usually takes place, gradually, in clutches of this character, the positive driving member or element will come into action and thus relieve the friction surfaces from further duty.

In clutches which I have constructed and used of this character, I have found that where the positive driving member or pin 24 and the pins 17 having the operating cams, are directly connected to the operating sleeve, a very great amount of force is required to disengage the clutch.

By means of my present construction, in which there is lost motion between the pins 20 and the sleeve, whereby when the sleeve is moved outwardly to disengage the clutch, the pin 24 is withdrawn from its engagement with the lug 25 before the pins 20 are moved, the power required to withdraw the sleeve 21 and disengage the clutch, is materially reduced.

Having thus described my invention what I claim is:

1. In a clutch the combination with an external member having an internal cylindrical friction surface, of an inner member having an external cylindrical friction surface adapted to engage said internal friction surface, a slidable sleeve mounted concentrically with said members, means for expanding said inner member to bring it into frictional engagement with said other member, connections between said means for expanding and said sleeve whereby said connections partake of part of the movement of said sleeve, there being lost motion between said connections and said sleeve, a positive driving member connected with said sleeve and adapted to engage a lug on said external clutch member whereby on the movement of said sleeve to disengage said clutch said positive driving member will be withdrawn from engagement prior to the movement of the connections between said sleeve and said expanding means.

2. In a clutch the combination with an external clutch member having an internal friction surface, and an internal clutch member having an external friction surface, of a lever mounted on said internal member adapted to expand the same into frictional engagement with said external member, a sleeve slidably mounted concentric with said members, a cam adapted to operate said lever and having a connection with said sleeve which permits lost motion between the sleeve and the cam whereby said cam partakes of less than the full movement of said sleeve, and a driving pin in said internal member connected with said sleeve and adapted to engage a lug on said external member.

3. In a clutch the combination with a member having internal friction surface of an inner coöperating member having an external cylindrical friction surface, a lever mounted on said internal member adapted by its movement to expand said internal member into frictional engagement with said first named member, a slidable sleeve mounted concentrically with said members, a driving pin secured to said sleeve adapted to engage a lug on said first named member, and pins slidably mounted in said sleeve having cam surfaces formed thereon adapted to engage said lever, and having collars or shoulders to limit the amount of their sliding in said sleeve.

4. In a clutch the combination with a clutch member having an internal cylindrical friction surface and a coöperating member having an external cylindrical friction surface of a cam and connections between said cam and said coöperating member whereby the movement of said cam causes the engagement and disengagement of said friction surfaces, a sleeve slidable co-axially with said clutch members, connection between said sleeve and said cam providing for lost motion whereby the sleeve may be moved a limited amount in either direction before the movement of the cam takes place, and a positive driving connection rigidly connected to said sleeve mounted in one of said members, adapted to engage the other.

In testimony whereof, I have signed my name to this specification in the presence of two subscribing witnesses.

JAMES CRAIG.

Witnesses:
EMMA C. CRAIG,
GEORGE F. HOYT.